(12) United States Patent  
Hollinger et al.

(10) Patent No.: US 10,956,229 B2  
(45) Date of Patent: Mar. 23, 2021

(54) MANAGING RESOURCE SHARING AND TASK BIDDING ON THE INTERNET OF THINGS (IOT)

(71) Applicant: INTERNATIONAL BUSINESS MACHINES CORPORATION, Armonk, NY (US)

(72) Inventors: Michael C. Hollinger, Austin, TX (US); Chang Chen, Cedar Park, TX (US); Rodolfo Lopez, Austin, TX (US); Juan G. Rivera, Austin, TX (US); Michael R. Reddock, Jersey City, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 236 days.

(21) Appl. No.: 16/152,405

(22) Filed: Oct. 4, 2018

(65) Prior Publication Data

US 2020/0110641 A1 Apr. 9, 2020

(51) Int. Cl.
*G06F 9/50* (2006.01)
*H04L 29/08* (2006.01)

(52) U.S. Cl.
CPC ............ *G06F 9/5083* (2013.01); *G06F 9/505* (2013.01); *H04L 67/12* (2013.01)

(58) Field of Classification Search
CPC ......... G06F 9/5083; G06F 9/505; H04L 67/12
See application file for complete search history.

(56) References Cited

U.S. PATENT DOCUMENTS 5,960,404 A   9/1999 Chaar et al.
6,477,563 B1 * 11/2002 Kawamura ........... G06F 9/4875
                                                    709/200

(Continued)

OTHER PUBLICATIONS

Kumar, Jayant. "Timeout Analysis, Troubleshooting and Notification in Real Time Bidding Advertising System with Implementation." Scientific and Academic Publishing, Jul. 3, 2017, article. sapub.org/10.5923.j.computer.20170703.01.html. Accessed Nov. 7, 2020. (Year: 2017).*

(Continued)

*Primary Examiner* — Wei Y Zhen
*Assistant Examiner* — Binh Luu
(74) *Attorney, Agent, or Firm* — Jason Sosa; Amy J. Pattillo

(57) ABSTRACT

A sourcing interface enables a particular device communicatively connected on a network to share one or more resources of the particular device with other devices communicatively connected to the network and coordinate task bidding with the other through broadcasting requests on the network. The sourcing interface manages dispatch of a particular task to one or more selected devices, the one or more selected devices selected based on one or more bids received by the particular device that best match a service level of particular request by the particular device, the dispatched task migrated to the one or more selected devices instead of handled by a web service provider. The sourcing interface monitors, at the particular device, for a result of execution of the particular task from the one or more selected devices, the one or more selected devices collecting telemetry data for usage reporting to the web service provider.

13 Claims, 9 Drawing Sheets

(56) References Cited

U.S. PATENT DOCUMENTS

| | | | | |
|---|---|---|---|---|
| 6,573,910 | B1* | 6/2003 | Duke | G06F 9/4843 |
| | | | | 358/1.14 |
| 6,912,533 | B1* | 6/2005 | Hornick | G06F 9/505 |
| | | | | 707/700 |
| 8,074,223 | B2 | 12/2011 | Birkestrand | |
| 8,266,237 | B2 | 9/2012 | Moore et al. | |
| 8,285,417 | B2 | 10/2012 | Kawaguchi | |
| 8,589,479 | B2 | 11/2013 | Doddavula | |
| 8,719,847 | B2 | 5/2014 | Agarwal et al. | |
| 9,031,531 | B2 | 5/2015 | Miluzzo et al. | |
| 9,092,263 | B2 | 7/2015 | Dorfel et al. | |
| 9,571,345 | B2 | 2/2017 | Ghosh et al. | |
| 9,837,820 | B2 | 12/2017 | Santinato et al. | |
| 9,900,172 | B2 | 2/2018 | Goel et al. | |
| 9,946,577 | B1* | 4/2018 | Stafford | H04L 29/08189 |
| 10,354,319 | B1* | 7/2019 | Kotas | G06Q 30/08 |
| 2001/0047322 | A1* | 11/2001 | Plate | G06Q 40/04 |
| | | | | 705/37 |
| 2012/0004973 | A1* | 1/2012 | Postrel | G06Q 30/02 |
| | | | | 705/14.27 |
| 2012/0053992 | A1* | 3/2012 | Erol | G06Q 30/0206 |
| | | | | 705/7.35 |
| 2013/0290450 | A1 | 10/2013 | Butler et al. | |
| 2014/0089027 | A1 | 3/2014 | Brown | |
| 2014/0351310 | A1* | 11/2014 | Ligman | G06F 9/5094 |
| | | | | 709/201 |
| 2016/0162478 | A1* | 6/2016 | Blassin | G06Q 10/06311 |
| | | | | 706/12 |
| 2016/0212576 | A1 | 7/2016 | Xia et al. | |
| 2016/0321115 | A1* | 11/2016 | Thorpe | G06F 11/3409 |
| 2017/0026872 | A1 | 1/2017 | Lin et al. | |
| 2017/0287062 | A1 | 10/2017 | Gupta | |
| 2017/0352071 | A1 | 12/2017 | Carey et al. | |
| 2018/0041566 | A1 | 2/2018 | Huang et al. | |
| 2018/0143975 | A1* | 5/2018 | Casal | G06F 40/58 |
| 2019/0155643 | A1* | 5/2019 | Bhageria | G06F 9/4881 |

OTHER PUBLICATIONS

Babar et al.; "Energy Flexometer: Transactive Energy-Based Internet Of Things Technology", published Mar. 6, 2018, Energies, 20 pages.

Rossello-Busquet et al.; "Towards Efficient Energy Management: Defining HEMS And Smart Grid Objectives", published 2011, International Journal on Advances in Telecommunications, vol. 4, No. 3&4, 15 pages.

Garcia et al.; "An Economical Cost Model For Fair Resource Sharing In Virtual Home Environments", published 2008, Next Generation Internet Networks, 8 pages.

Kaleci et al.; "Performance Analysis Of Bid Calculation Methods In Multirobot Market-Based Task Allocation", Turkish Journal of Electrical Engineering and Computer Science, published Mar. 22, 2013, available online at <http://journals.tubitak.gov.tr/elektrik/>, 21 pages.

"A Distributed Task Management Solution for Peer-To-Peer and Cloud Enviomments", published 2011, accessed from <http://scholar.uwindsor.ca/cgi/viewcontent.cgi?article=1105&context=etd> as of Sep. 8, 2018, 101 pages.

"Storj Cloud Storage", accessed from <https://storj.io/> as of Sep. 8, 2018, 12 pages.

* cited by examiner

MANAGING RESOURCE SHARING AND TASK BIDDING ON THE INTERNET OF THINGS (IOT)

BACKGROUND

1. Technical Field

This invention relates in general to computing systems and more particularly to managing resource sharing and task bidding on the Internet of Things (IoT).

2. Description of the Related Art

More homes include voice activated appliance services and other services for actuating things on the Internet of Things (IoT). The voice activated appliance services detect voice command spoken by a user, send a detected voice recording to a remote web service, and then control, via the remote web service, one or more appliances in a home based on a voice command in the voice recording. In addition, many homes include home devices and appliances that connect to a local area network within the home, to connect more broadly to the IoT.

BRIEF SUMMARY

In one embodiment, a method is directed to enabling, by a computer system, a particular device communicatively connected on a network, to share one or more resources of the particular device with a plurality of devices communicatively connected to the network and coordinate task bidding with the plurality of devices through broadcasting requests on the network. The method is directed to monitoring, by the computer system, for a new task needing to be performed and designated to be sourced to a web service provider. The method is directed to responsive to detecting the new task designated to be sourced to the web service provider, estimating, by the computer system, a local cost of managing the new task locally by the particular device. The method is directed to, responsive to the local cost not exceeding a maximum threshold, determining, by the computer system, whether the new task is received from a top level requestor. The method is directed to, responsive to detecting the new task is received from the top level requestor, releasing, by the computer system, control of the new task to be managed locally by the particular device. The method is directed to, responsive to the local cost exceeding the maximum threshold, coordinating, by the computer system, task bidding with the plurality of devices by broadcasting a particular request for costs for the new task on the network. The method is directed to, monitoring, by the computer system, for one or more initial bids returned by the plurality of devices, the one or more initial bids each specifying a separate offer cost for managing the new task. The method is directed to, selecting, by the computer system, from among the one or more initial bids, one or more bids from one or more selected devices, where the one or more bids from the one or more selected devices best match a cost and the service level of the particular request. The method is directed to managing, by the computer system, dispatch of the new task as a particular task to the one or more selected devices of the plurality of devices, the particular task migrated to the one or more selected devices instead of handled by the web service provider by: sending, by the computer system, an acceptance and the particular task to the one or more selected devices; waiting, by the computer system, for an acknowledgement of the acceptance from the one or more selected devices before a timeout is reached and monitoring for a task response for the particular task from the one or more selected devices; responsive to reaching the timeout before the acknowledgment is received, managing, by the computer system, a subsequent determination whether to manage sourcing the particular task among the plurality of devices; responsive to receiving the task response with an error indicator, managing, by the computer system, the subsequent determination whether to manage sourcing the particular task among the plurality of devices; responsive to receiving the task response with a task completed indicator, returning, by the computer system, a notification and a result from the task response to a requestor; and responsive to an execution timeout reached before the task response is received, managing, by the computer system, the subsequent determination whether to manage sourcing the particular task among the plurality of devices. The method is directed to monitoring, by the computer system, at the particular device, for a result of execution of the particular task from the one or more selected devices, the one or more selected devices collecting telemetry data for usage reporting to the web service provider.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to enable a particular device communicatively connected on a network, to share one or more resources of the particular device with a plurality of devices communicatively connected to the network and coordinate task bidding with the plurality of devices through broadcasting requests on the network. The stored program instructions comprise program instructions to monitor for a new task needing to be performed and designated to be sourced to a web service provider. The stored program instructions comprise program instructions, responsive to detecting the new task designated to be sourced to the web service provider, to estimate a local cost of managing the new task locally by the particular device. The stored program instructions comprise program instructions to, responsive to the local cost not exceeding a maximum threshold, determine whether the new task is received from a top level requestor. The stored program instructions comprise program instructions to, responsive to detecting the new task is received from the top level requestor, release control of the new task to be managed locally by the particular device. The stored program instructions comprise program instructions to, responsive to the local cost exceeding the maximum threshold, coordinate task bidding with the plurality of devices by broadcasting a particular request for costs for the new task on the network. The stored program instructions comprise program instructions to monitor for one or more initial bids returned by the plurality of devices, the one or more initial bids each specifying a separate offer cost for managing the new task. The stored program instructions comprise program instructions to select from among the one or more initial bids, one or more bids from one or more selected devices, where the one or more bids from the one or more selected devices best match a cost and the service level of the particular request. The stored program instructions comprise program instructions to manage dispatch of the new task as a particular task to the one or more selected devices of the plurality of devices, the particular device that best match a service level of particular request by the particular device, the dispatched particular task migrated to the one or more selected devices instead of handled by the web service provider, by the stored program instructions further comprising: program instructions to send an acceptance and the particular task to the one or more selected devices; program instructions to wait for an acknowledgement of the acceptance from the one or more selected devices before a timeout is reached and monitoring for a task response for the particular task from the one or more selected devices; program instructions, responsive to reaching the timeout before the acknowledgment is received, to manage a subsequent determination whether to manage sourcing the particular task among the plurality of devices; program instructions, responsive to receiving the task response with an error indicator, to manage the subsequent determination whether to manage sourcing the particular task among the plurality of devices; program instructions, responsive to receiving the task response with a task completed indicator, to return a notification and a result from the task response to a requestor; and program instructions, responsive to an execution timeout reached before the task response is received, to manage the subsequent determination whether to manage sourcing the particular task among the plurality of devices. The stored program instructions comprise program instructions to monitor, at the particular device, for a result of execution of the particular task from the one or more selected devices, the one or more selected devices collecting telemetry data for usage reporting to the web service provider.

In another embodiment, a computer program product comprises a computer readable storage medium having program instructions embodied therewith, wherein the computer readable storage medium is not a transitory signal per se. The program instructions executable by a computer to cause the computer to enable, by a computer, a particular device communicatively connected on a network, to share one or more resources of the particular device with a plurality of devices communicatively connected to the network and coordinate task bidding with the plurality of devices through broadcasting requests on the network. The program instructions executable by a computer to cause the computer to monitor, by the computer, for a new task needing to be performed and designated to be sourced to a web service provider. The program instructions executable by a computer to cause the computer to, responsive to detecting the new task designated to be sourced to the web service provider, estimate, by the computer, a local cost of managing the new task locally by the particular device. The program instructions executable by a computer to cause the computer to, responsive to the local cost not exceeding a maximum threshold, determine, by the computer, whether the new task is received from a top level requestor. The program instructions executable by a computer to cause the computer to, responsive to detecting the new task is received from the top level requestor, release, by the computer, control of the new task to be managed locally by the particular device. The program instructions executable by a computer to cause the computer to, responsive to the local cost exceeding the maximum threshold, coordinate, by the computer, task bidding with the plurality of devices by broadcasting a particular request for costs for the new task on the network. The program instructions executable by a computer to cause the computer to monitor, by the computer, for one or more initial bids returned by the plurality of devices, the one or more initial bids each specifying a separate offer cost for managing the new task. The program instructions executable by a computer to cause the computer to select, by the computer, from among the one or more initial bids, one or more bids from one or more selected devices, where the one or more bids from the one or more selected devices best match a cost and the service level of the particular request. The program instructions executable by a computer to cause the computer to manage, by the computer, dispatch of the new task as a particular task to the one or more selected devices of the plurality of devices, the particular task migrated to the one or more selected devices instead of handled by the web service provider, by the program instructions further executable by the computer to cause the computer to: send, by the computer, an acceptance and the particular task to the one or more selected devices; wait, by the computer, for an acknowledgement of the acceptance from the one or more selected devices before a timeout is reached and monitoring for a task response for the particular task from the one or more selected devices; responsive to reaching the timeout before the acknowledgment is received, manage, by the computer, a subsequent determination whether to manage sourcing the particular task among the plurality of devices; responsive to receiving the task response with an error indicator, manage, by the computer, the subsequent determination whether to manage sourcing the particular task among the plurality of devices; responsive to receiving the task response with a task completed indicator, return, by the computer, a notification and a result from the task response to a requestor; and responsive to an execution timeout reached before the task response is received, manage, by the computer, the subsequent determination whether to manage sourcing the particular task among the plurality of devices. The program instructions executable by a computer to cause the computer to monitor, by the computer, at the particular device, for a result of execution of the particular task from the one or more selected devices, the one or more selected devices collecting telemetry data for usage reporting to the web service provider.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
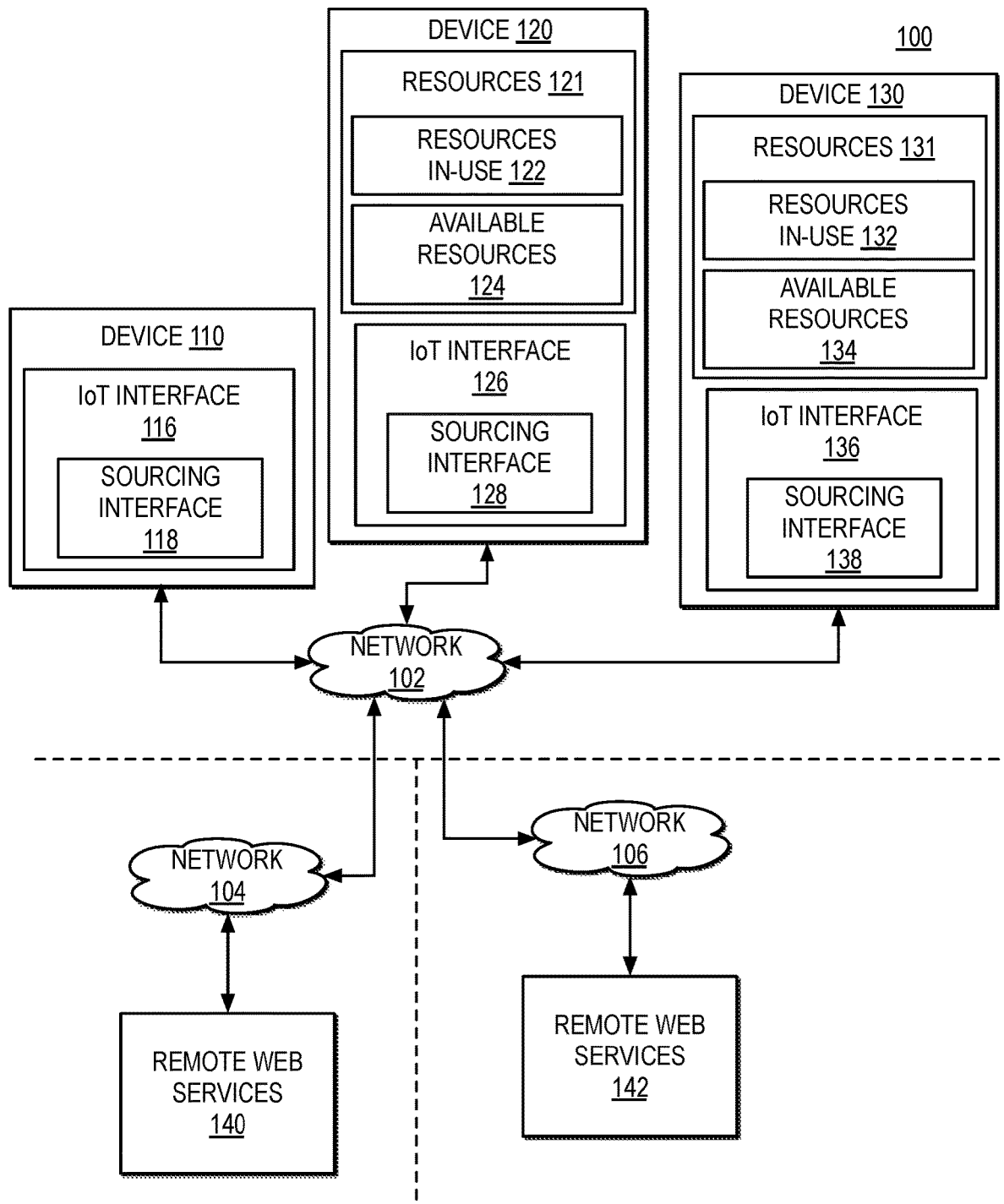
FIG. 1 is a block diagram illustrating one example of a network environment for managing resource sharing and task bidding on devices connected through an IoT.

FIG. 1 illustrates a block diagram of one example of a network environment for managing resource sharing and task bidding on devices connected through an IoT.

In an embodiment, a network environment 100 facilitates an IoT of one or more IoT things, illustrated by one or more types of devices, such as device 110, device 120, and device 130, each embedded with one or more types of interfaces that provide accessibility to a network, described as IoT interfaces, illustrated by IoT interface 116, IoT interface 126, and IoT interface 136, respectively. In one example, IoT interface 116, IoT interface 126, and IoT interface 136 enable device 110, device 120, and device 130, respectively, may include one or more network interfaces that enable each device to connect and exchange data over one or more networks, such as a network 102, a network 104, and a network 106. In one example, an IoT refers to the use of network-connected devices, embedded in the physical environment. In one example, an IoT environment may be more complex than other network based technology applications, including cloud-based applications on top of which an IoT may run, in part, because IoT may include diverse hardware, diverse operating systems and software on devices, and different network gateway requirements. In additional or alternate embodiments, network environment 100 may include additional or alternate devices and networks communicatively connected and may include additional controllers and network control layers.

In one example, the types of devices illustrated by device 110, device 120, and device 130 include, but are not limited to, one or more computing devices, one or more vehicles, one or more home appliances, and one or more other types of items. In one example, the one or more types of IoT interfaces include, but are not limited to electronics, software, sensors, actuator, and connectivity which enables the one or more devices to connect and exchange data. In one example, device 110, device 120, and device 130 includes hardware and software that directly interacts with the world and connect to a network to communicate with each other and to web services. Each of device 110, device 120, and device 130 may provide or consume one or more various types of information.

In one example, each of network 102, network 104, and network 106 represent one or more of a local area network, a public network, or a combination of networks. One or more of network 102, network 104, and network 106 may represent or include one or more gateway enabled devices that connect devices to one or more types of services, such as remote web services 140 and remote web services 142. In one example, gateways may manage traffic between networks that use different protocols.

In one embodiment, by enabling or embedding IoT interfaces into devices connected within network environment 100, the IoT facilitated in network environment 100 extends Internet connectivity beyond standard network connected computing devices, such as, but not limited to, desktops, laptops, smartphones, and tablets, to any range of devices that are not-traditionally-Internet-enabled, such as, but not limited to, vehicles and home appliances. Through the IoT interfaces, such as IoT interface 116, IoT interface 126, and IoT interface 136, both standard devices and devices not-traditionally-Internet-enabled may communicate and interact over the Internet, as well as enabling remote monitoring and control of these devices.

In one embodiment, IoT interfaces in devices within network 100, such as IoT interface 116, IoT interface 126, and IoT interface 136, may implement sensing and actuating capability that includes performance of one or more sensing jobs, one or more actuator jobs, or a combination of sensing and actuating jobs. In one example, sensing capabilities may represent a combination of sensors embedded with or accessible to the IoT interface to monitor the state or surrounding environment and hardware or software that filters the monitored state information. In one example, actuator capabilities may represent output interfaces that reach out and act on the world. In one example, sensors include voice activated sensors that monitor sounds within an environment surrounding the device and determine whether the monitored sounds match words or other sounds for triggering voice activated control. For example, Amazon's Alexa (AMAZON and ALEXA are Registered Trademarks of Amazon.com Inc.), Google's Home (GOOGLE HOME is a Registered Trademark of Google LLC), and Apple's Siri (APPLE and SIRI are Registered Trademarks of Apple Inc.) are examples of devices that include sensors for enabling voice activated services. In one example, a sensor may first filter sounds in an environment to detect a particular trigger sound or word, and upon hearing that particular trigger sound or word, then activate a recording sensor to detect the audio following the trigger sound or word, where the audio following the trigger sound or word may include an instruction or request for service.

In one embodiment, IoT interfaces in devices within network 100, such as IoT interface 116, IoT interface 126, and IoT interface 136, may implement a tasking capability. In one example, the tasking capability may allow another device embedded with an IoT interface, or a user, to remotely control the device through the Internet.

In one embodiment, both the sensing and actuating capability and the tasking capability of devices embedded with IoT interfaces within network environment 100 may also rely on remote web services for performing one or more tasks of the jobs performed for the sensing and actuating capability and tasking capability. In one example, remote web services 140 and remote web services 142 perform one or more tasks including, but not limited to, transforming data, aggregating data and computing, enriching data, and moving data. In one example, transforming data includes converting data into another format, such as, but not limited to, converting a captured device signal voltage to a calibrated unit measure of temperature, converting voice signals into text, and converting text data into voice signals. In one example, aggregating data and computing includes, but is not limited to, combining data received from multiple devices and checking the data against thresholds or combining redundant data received from multiple devices to ensure that actionable data is available if one or more devices go offline. In one example, enriching data includes, but is not limited to, combining data generated by a device with other metadata or other data sets, such as weather data or traffic data, for subsequent uses and applications. In one example, moving data includes, but is not limited to, storing processed data in one or more selected storage locations.

In one embodiment, IoT interface 116 may represent a home appliance registered to connect with remote web services 140 for remote web services 140 to perform one or more tasks for sensing and actuating jobs and tasking jobs and IoT interface 126 may represent a home appliance registered to connect with remote web services 142 to perform one or more tasks for sensing and actuating jobs and tasking jobs. In one example, IoT interface 136 is not registered to connect with any remote web services for job performance, but may represent a home appliance that is directed by another home appliance over network 102 or may represent a standard computing device connected over network 102. In one example, even if an IoT interface is not registered to connect with any remote web service, the IoT interface may support a remote access interface for enabling remote monitoring or tasking by a user.

In one example, remote web services 140 represent one or more types of services for performing a task of processing audio captured by IoT interface 116 by transforming the audio into text, determining whether the text triggers a task for directing a device, and if the text triggers a task for directing a device, determining the instruction for the task a device and sending the task back to IoT interface 116 to finish the job with the selected task. For example, if IoT interface 116 includes sensing functionality for voice activated control, remote web services 140 may perform a job of processing audio streamed by IoT interface 116 as likely including the phrase "turn on the lights", select a task for turning on lights and output instructions to one or more devices with embedded IoT interfaces to perform a task of turning on a light.

In one example, remote web services 142 represent one or more types of services for performing a task of processing video captured by device 120 and streamed via IoT interface 126 to remote web services 142, for determining whether the video content matches any type of content that a user has set to trigger a warning or a marker. In one example, remote web services 142 performs tasks of transforming the video content into a format that can be analyzed to detect selected items and moving data to a storage location for the user to access from an archive. Remote web services 142 may charge a user a subscription fee for performing video analysis and video storage and monitoring through remote web services 142 of video captured by device 120.

In one example, network 102 may represent a user's trusted, local area network, while network 104 and network 106 each represent networks outside of or external to a user's trusted, local area network. In the example, one or more tasks of the sensing and actuating capability and tasking capability performed by remote web services 140 and remote web services 142 to support one or more of IoT interface 116, IoT interface 126, and IoT interface 136, are processed on systems outside of a user's control, at the remote web services, even though there may be local computing resources available for performing the processing the tasks for one or more of the sensing and actuating capability and tasking capability on devices connected within a user's trusted, local area network. In the example, device 110, device 120, and device 130 represent devices in the user's home, connected to the user local area network 102, that each include an IoT interface, and device 120 and device 130 also include one or more computing resources, illustrated at resources 121 and resources 131, respectively. In one example, the computing resources within a device may include, but are not limited to, RAM, processors, storage, connectivity to a home network, sensors, and output devices. At any given time, many of the devices in the user's home, connected to local area network 102, may be idle and not making use of their computing resource, or may be in use and only partially using the available computing resources, or may be in use and reaching the limits of the device's computing resources. For example, device 120 may represent a video recorder that has used almost all the storage space available, while device 130 may represent a laptop computer with 50% unused storage space, but a processor that is 100% utilized while performing video processing. In the example, one or more of IoT interface 116, IoT interface 126, and IoT interface 136 may also represent interfaces on devices that are communicatively connected on network 102, but which are not registered with any remote web services.

In one embodiment, according to an advantage of the invention, one or more IoT interfaces of devices in network environment 100 include a sourcing interface, such as sourcing interface 118 of IoT interface 116, sourcing interface 128 of IoT interface 126 and sourcing interface 138 of IoT interface 136. In one example, sourcing interface 118, sourcing interface 128, and sourcing interface 138 facilitate peer-to-peer resource sharing and task bidding between devices with IoT interfaces, to enable sharing of resources available on devices with IoT interfaces. In one example, without sourcing interface 118 enabled, IoT interface 116 may use only remote web services 140 for all jobs, regardless of the needs of the job. In contrast, according to an advantage of one embodiment of the invention, with sourcing interface 118 enabled, IoT interface 116 may request use of idle computing resources for performing tasks on other devices with IoT interfaces connected to a selected network, such as a local area network illustrated by network 102, and manage job bidding with other devices with IoT interfaces connected to the selected network, to make idle computing resources within a network of devices with IoT interfaces available for processing tasks that would otherwise be sent to remote web services 140. For example, through sourcing interface 118, IoT interface 116 may migrate tasks generally scheduled to be handled by remote web services 140 or remote web services 142 for one or more of the sensing jobs and tasking jobs of IoT interface 116 for processing through idle processing resources on device 120 through IoT interface 126, providing an advantage of using idle processing resources in devices connected to a selected network of local area network 102, rather than consuming remote processing power of remote web services 140 or remote web services 142, to minimize costs of processing the job, minimize network bandwidth and time latency, and minimize exposure of data in the tasks to security breaches outside of local area network 102. In one example, task migrated by sourcing interface 118, sourcing interface 128, and sourcing interface 138 include, but are not limited to, network-attached storage (NAS) based storage tasks, memory tasks, such as non-volatile memory express (NVMe) tasks, transcoding and compression tasks, such as video and format conversions, and computing and processing tasks. In another embodiment, one or more of remote web services 140 and remote web services 142 may also represent devices that include an IoT interface with a sourcing interface.

In one example, each of sourcing interface 118, sourcing interface 128, and sourcing interface 138 manages one or more types of functions including, but not limited to registering for sourcing with other IoT interfaces by allowing sourcing of tasks and setting the interface to accept requests for sourcing within a selected network, sending out a request for sourcing to other IoT interfaces connected to the selected network, and responding to a request for sourcing received from other IoT interfaces connected to the selected network. In addition, as tasks run on available resources of a device, the sourcing interface for that device collects license and telemetry data for the task for eventual chargeback or usage reporting to one or more remote web services. In one embodiment, according to an advantage of the invention, a user's own home and commercial appliances connected via a local area network, such as network 102, are available to locally handle tasks that are more commonly cloud based tasks by collecting license and telemetry data for the tasks, to use in chargeback or usage. For example, by collecting license and telemetry data when the task is handled by device 110, device 120, or device 130, such as in a user's local area network, rather than relying on remote services 140 or remote web services 142, such as cloud based subscription services, tasks are sourced to a user's own home and commercial appliances, where the tasks would otherwise be performed by remote web services, and the user may be charged or credited by a remote web service for the local task handling.

In one example, license data may include records of any third party software, hardware, or service required for completing a job. For example, if completing a job requires storing 5 GB of data in a third party cloud service and costs $5, then the licensing for use of the third party cloud service is collected for eventual chargeback or usage reporting to remote web services 140 or remote web services 142 and may also be considered when determining a best way to handle a job.

In one example, telemetry data refers to one or more of usage statistics based on data, data acquisition, and data collected. In one example, telemetry data may be collected by applying one or more protocols that enable data collection through remote telemetry units (RTUs), accessible to or activated through sourcing interface 118, sourcing interface 128, and sourcing interface 138. In one example, telemetry data refers to the data collected from each device via a sensor, transceiver, or other data monitor that measures a value such as, but not limited to, voltage, humidity, temperature, data compression rates, encoding/decoding rates, I/O reads/writes per second, I/O throughput, network bandwidth, streaming rates, and other detectable values related to task data.

In one example, telemetry data may be used for chargeback or usage reporting to remote web services 140 and remote web services 142 to adjust a computational cost for task that is ordinarily handled by remote web services 140 or remote web services 142, but when sourced to device 110, device 120, or device 130, reduces the task computations required by the remote web service. For example, if remote web services 140 or remote web services 142 charges a fee for a task that requires storage, but the storage task is sourced to device 110, device 120, or device 130, then the remote web service accesses the telemetry data indicating storage usage, such as I/O read/writes per second or I/O throughput, and adjusts the fee for the task according to the storage usage data provided.

In one example, remote web services 140 and remote web services 142 may, in identifying a cost of a task, set a cost based on one or more models, including, but not limited to, a flat fee, a telemetry data usage based fee, a subscription fee, and other fee structures. In one example, remote web services 140 and remote web services 142 may offer, to a user or to a particular device, an adjustment of a fee for a cost of a task, where the adjustment may include, but is not limited to, reducing or eliminating a fee, providing credits for handling other tasks, providing discounts on products, such as through providing digital coupons, and other financial offers.

In one example, by distributing sourcing interface 118, sourcing interface 128, and sourcing interface 138 across devices, a user may select which devices to register for resource sharing, among multiple devices connected to a selected network of local area network 102, without requiring a centralized arbiter or other type of routing service. In one example, sourcing interface 118, sourcing interface 128, and sourcing interface 138 may each broadcast requests, listen for requests, bid on requests, and select which bid to accept in a peer-to-peer network without requiring a centralized arbiter or controller for managing registration, requests, or selections. In one example, each sourcing interface is enabled to apply a scoring mechanism for determining which bid offers are a best match for a task.

In one example, sourcing interface 128 and sourcing interface 138 may connect to or receive data from an operating system layer or other layer of each of device 120 and device 130, respectively, that reports which portions of resources 121 and resources 131 are in-use and which are currently available. In one example, sourcing interface 128 identifies a selection of resources currently in-use from among resources 121 as resources in-use 122 and a remaining selection of resources that are available from among resources 121 as available resources 124. In addition, in one example, sourcing interface 138 identifies a selection of resources currently in-use from among resources 131 as resources in-use 132 and a remaining selection of resources that are available from among resources 131 as available resources 134. In one example, available resources 124 and available resources 134 include one or more of resources that are available for resource sharing for received sourced tasks from other devices. In one example, in responding to broadcast requests, each of sourcing interface 128 and sourcing interface 138 may determine if available resources 124 and available resources 134, respectively include sufficient resources for handling a task, and if so, determine a cost of performing the task in the broadcast request on the available resources.

Figure 2:
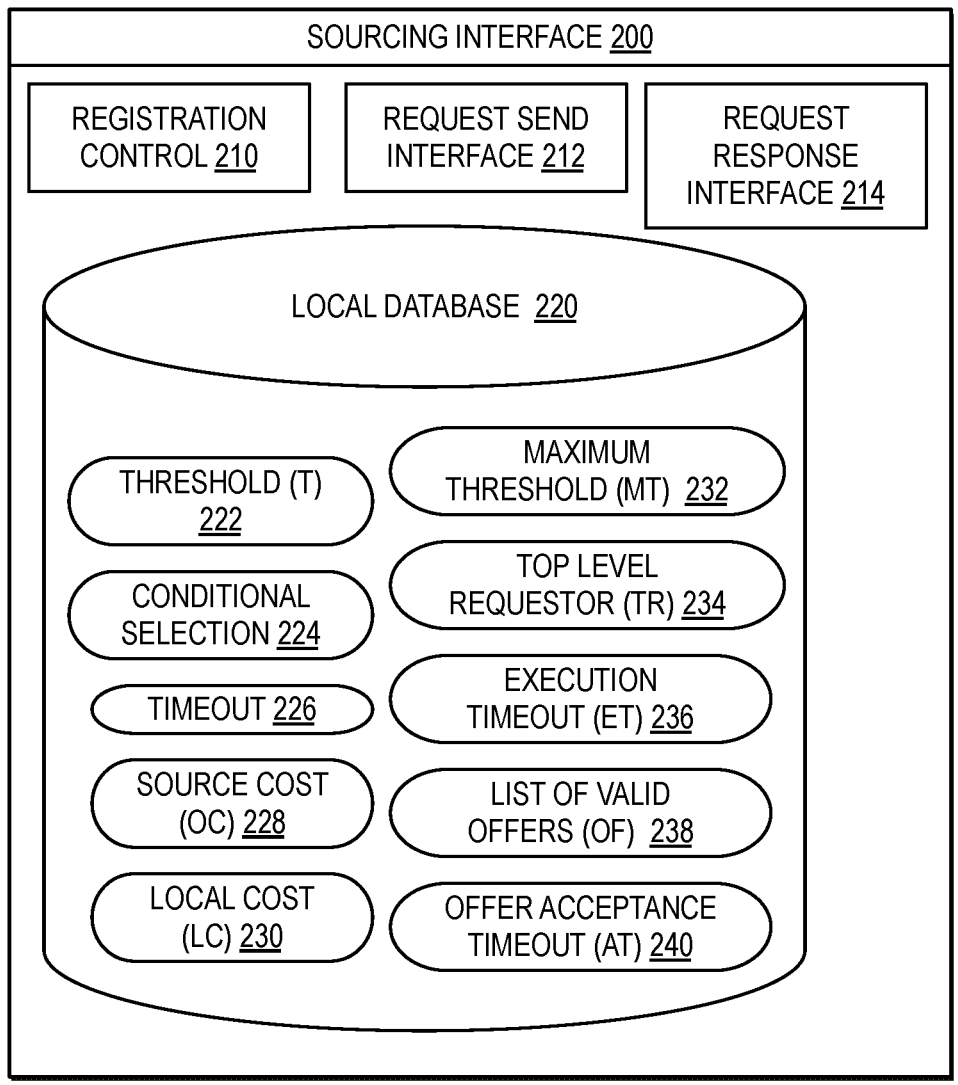
FIG. 2 is a block diagram illustrating one example of a device sourcing interface for managing resource sharing and task bidding between devices with IoT interface connectivity.

FIG. 2 illustrates a block diagram of a device sourcing interface for managing resource sharing and task bidding between devices with IoT interface connectivity.

In one example, a sourcing interface 200 illustrates an example of functionality of one or more sourcing interface 118, sourcing interface 128, and sourcing interface 138. In one example, each instance of sourcing interface 200 is specified for communicating via one or more protocols implemented for network connectivity through an IoT interface.

In one embodiment, sourcing interface 200 manages a registration control 210 for managing registration of a device for handling job sourcing within a selected network of devices. In particular, in one example, a user of a device determines if and how available computing resources of the device will be shared and sets one or more of cost thresholds, conditional selections, timeouts, and visibility to other devices. In one example, a local database 220 maintains one or more settings selected by a user or automatically selected during the registration process managed by registration control 210.

In one example, when triggered for registration, registration control 210 selects to allow sourcing of tasks within a selected network of devices. Registration control 210 sets a value for a cost threshold (T) 222 in local database 220. Registration control 210 sets one or more conditions in conditional selection 224 in local database 220, where the conditions may be used to improve performance by reducing waiting time if a condition is met. For example, if an offer shows up with a source cost that is less than a local cost, conditional selection 224 may indicate that the bidder with the lower source cost should be selected immediately and to stop waiting for any additional offers. In addition, conditional selection 224 may specify a maximum number of offers to wait for when waiting for offers. In addition, registration control 210 sets a timeout 226 in local database 220 where timeout 226 sets a maximum time to wait for a bidder's cost to perform a task, which may be set during registration or may be set at other points in time by registration control 210. In one example, registration control 210 sets a value in maximum threshold (MT) 232 in local database 220 to cost threshold (T) 222 summed with a value in timeout 226 in local database 220, which indicates the minimum total cost if timeout is reached, after which offers will be requested only if the local cost is higher than MT 232. In addition, registration control 210 may define conditions for automatic offer acceptance in local database 220. In addition, registration control 210 sets device sourcing interface 200 to listen for and accept broadcast requests for job processing within a selected network.

In one example, once registration control 210 sets sourcing interface 200 to listen for and accept broadcast requests for task processing in a selected network, depending on the resource sharing preferences set during registration, sourcing interface 200 sets request send interface 212 to monitor for tasks that may need to be sourced and sets request response interface 214 to listen to and respond to sourcing broadcast requests.

In one embodiment, sourcing interface 200 manages a request send interface 212 for monitoring one or more jobs of the IoT interface of a device that include tasks that may need to be sourced, selecting to send a request for sourcing one or more tasks within a selected network, and managing sourcing of the one or more tasks to a best match device within a selected network. In one example, in sending a request for sourcing, request send interface 212 selects one or more parameters of the task such as, but not limited to, a task description, a task resource requirement type, a requester identification, a cost limit, and a service level agreement (SLA) for performance of the task.

In one example, request send interface 212 initially detects that a task shows up at an IoT interface of a device that may be a candidate for sourcing, acquires control of the task, and sets a top level requestor (TR) 234 flag of the task if the device is the "root" of the task processing tree, in the event of recursive sourcing. In particular a job may include multiple tasks, which may be organized hierarchically in a task processing tree. In one example, the top level requestor flag indicates whether the requestor is the first device in a task processing tree from which a whole task chain in the task processing tree is initiated. Next, if resources are available on the device with the IoT interface, request send interface 212 estimates a local cost (LC) 230 in local database 220 for processing the task. In one example, in computing LC 230, the cost may represent a series of variable and constants, multiplied together, and summed, to determine an overall cost. For example, in computing LC 230, request send interface 212 considers one or more factors, such as, but not limited to, the job CPU, the W CPU, and the device CPU summed with the job RAM, the W RAM, and the device RAM summed with the job storage, the W storage, and the device storage, summed with the job billing and the per device chargeback estimate. In one example, job CPU, job RAM, and job storage may represent pre-set CPU, RAM and storage resources required by a task. In one example, W CPU, W RAM, and W storage may represent fixed, pre-determined weights used to adjust the relative contribution of the resource. In one example, device CPU, device RAM, and device storage may represent a device's relative performance. In addition, request send interface 212 may include additional factors for other types of resources, such as a graphics processing unit (GPU). For example, in computing LC 230, request send interface 212 may have a low job CPU, but a high job GPU for a GPU intensive task like video encoding, such that computing LC 230 should be calculated to reflect low CPU usage and needs, but higher CPU usage and needs. In another example, a small IoT device, with an efficient, but small processor, may have a higher device CPU than a computer with a larger processor, where the device CPU indicates which CPU is able to complete a task more quickly.

In one example, request send interface 212 applies one or more billing and device chargeback estimate equations for calculating costs. Request send interface 212 compares LC 230 with MT 232 to determine if a request for sourcing is needed because the local cost 230 is greater than the maximum threshold 232, or may perform other comparison to determine if it is expensive to perform the task locally.

In one example, if request send interface 212 determines a request for sourcing is not needed because the task can be handled locally on the device, if the current device is set in TR 234, then the task is released to be executed locally on the resources available on the device with the IoT interface and request send interface 212 releases responsibility for monitoring the task upon task completion. Otherwise, if the task is released to be executed locally and the current device is not set in TR 234, then request send interface 212 compiles any results of the local cost calculation and any errors and reports the compiled errors and results back to the requestor. If there are any errors that render the results not received correctly, request send interface 212 analyzes the task and determines whether to negotiate sourcing of the task.

In one example, if request send interface 212 determines a request for sourcing is needed, then request send interface 212 broadcasts a request on a selected network. In the example, the IoT interfaces, with sourcing set to accept broadcasts requests within a selected network, will detect the broadcast request. Request send interface 212 waits for offers returned by one or more sourcing interfaces. In one example, if resource send interface 212 waits for offers longer than a time set in timeout 226 and has not received any offers, then resource send interface 212 identifies whether the task can be executed locally and either manages local execution and release on completion or forwards the task back to the original requestor. If resource send interface 212 identifies one or more offers before reaching a timeout 226, resource send interface 212 collects the offers in list of valid offers (OF) 238. Resource send interface 212 may immediately discard any offers that are higher than LC 230. Resource send interface 212 selects one of the offers that is a best match, begins negotiating with the device that submitted the selected offer by sending an acceptance of the offer and the task to the selected device and waiting for an acknowledgement. If the acceptance is not acknowledged within a time set in an offer acceptance timeout (AT) 240, resource send interface 212 may select another offer from list of valid officers (OF) 238 or re-estimate the cost of the job and determine whether sourcing is necessary. If the acceptance is acknowledged, resource send interface 212 monitors the task and waits for a completion notification. If resource send interface 212 does not receive a completion notification or error notification prior to reaching a time set in execution timeout (ET) 236 subsequent to the task being sent, resource send interface 212 may determine the time allowed for processing a sourced task timed out and trigger an error. If an error is triggered, resource send interface 212 may restart the process of cost analysis and determining whether to broadcast requests for sourcing. If no error is triggered, once a completion notification is received, resource send interface 212 forwards the notification and result to the requesting job.

In one embodiment, device sourcing interface 200 implements a request response interface 214 for monitoring for sourcing requests output by other devices on a selected network, determining an availability of the device to handle a sourced task to meet a user service level agreement requirement, responding to the sourcing request with the devices availability, and managing a sourced task if selected.

In one example, once sourcing interface 200 is set during registration to allow resource sharing and enters a selected network, request response interface 214 listens for task requests from other sourcing interfaces via broadcast. In response to request response interface 214 detecting a request arrive via broadcast, request response interface 214 estimates the OC 228 for handling the task using resources available on a device, if available, based on a task definition sent in the request. Next, request response interface 214 sends OC 228 in an offer in response to the request. Next, request response interface 214 waits for an acceptance of the offer within a time set in offer acceptance timeout (AT) 240. In one example, if request response interface 214 waits longer than the time set in offer acceptance timeout (AT) 240 without receiving an acceptance, request response interface 214 may stop waiting. In one example, if request response interface 214 receives an acceptance and task details within the time set in offer acceptance timeout (AT) 240, request response interface 214 sends an acknowledgement of the acceptance to the requestor and sends the task to the available resources. If an error occurs in handling the task on the available computing resources, request response interface 214 returns an error response. If the task is completed on the available computing resources without error, then request response interface 214 returns a complete response and the results of the task. In addition, during processing, request response interface 214 may trigger request send interface 212 to determine whether it may be less expensive for the device receiving the sourced task to source the task or a subtask to another device, wherein request response interface 214 then monitors for completion of the task and any subtasks sourced to another device.

In one example, request send interface 212, in response to sending a task for sourcing, monitors one or more aspects of the cost of handling the task in a source cost (OC) 228. In one example, source cost (OC) 228 may include license and telemetry data received from other sourcing interfaces and remote web services. In one example, sourcing interface 200 manages one or more types of billing or chargeback to the remote web services or other accounts based on source cost (OC) 228. For example, sourcing interface 200 may negotiate with a remote web services provider to locally process a task on a selected network in exchange for charging all or a portion of the cost of the local processing back to the remote web services provider, since the remote web services provider may receive a cost savings by sourcing all or a portion of the task processing costs.

Figure 3:
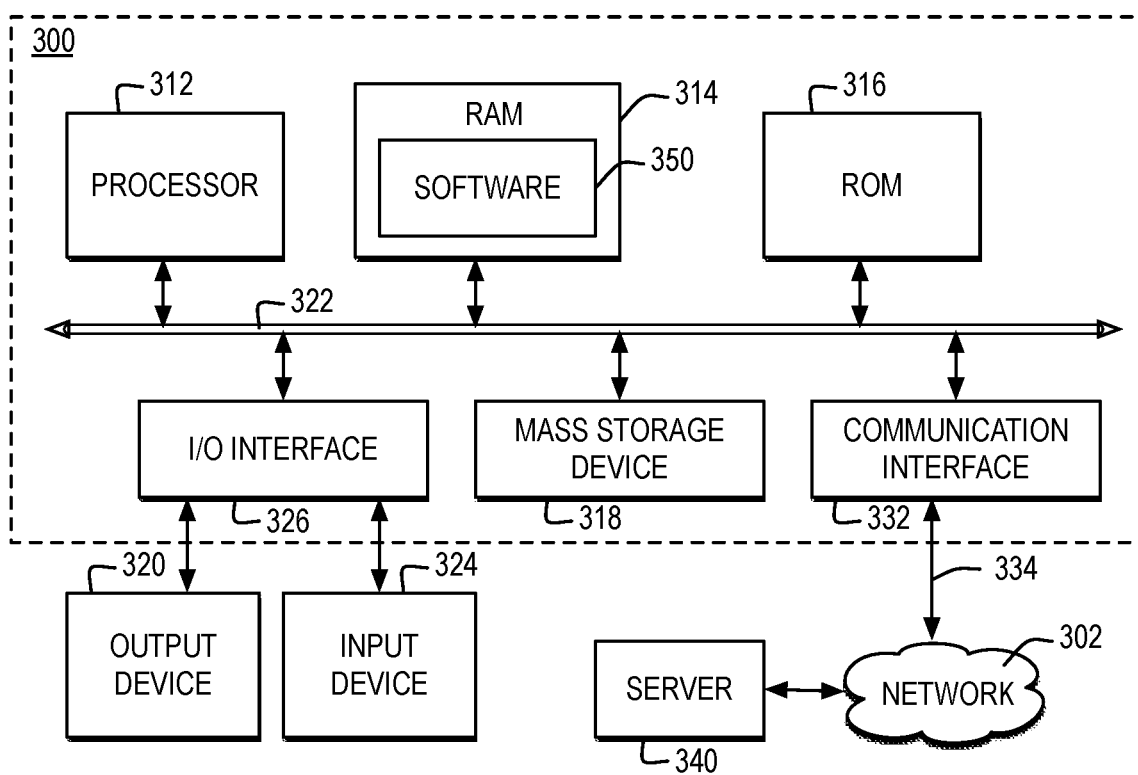
FIG. 3 is a block diagram illustrating one example of a computer system in which one embodiment of the invention may be implemented.

FIG. 3 illustrates a block diagram of one example of a computer system in which one embodiment of the invention may be implemented. The present invention may be performed in a variety of systems and combinations of systems, made up of functional components, such as the functional components described with reference to a computer system 300 and may be communicatively connected to a network, such as network 302.

Computer system 300 includes a bus 322 or other communication device for communicating information within computer system 300, and at least one hardware processing device, such as processor 312, coupled to bus 322 for processing information. Bus 322 preferably includes low-latency and higher latency paths that are connected by bridges and adapters and controlled within computer system 300 by multiple bus controllers. In one embodiment, when implemented as a server or node, computer system 300 includes multiple processors designed to improve network servicing power.

In one embodiment, processor 312 is at least one general-purpose processor that, during normal operation, processes data under the control of software 350, which includes at least one of application software, an operating system, middleware, and other code and computer executable programs accessible from a dynamic storage device such as random access memory (RAM) 314, a static storage device such as Read Only Memory (ROM) 316, a data storage device, such as mass storage device 318, or other data storage medium. In one embodiment, software 350 includes, but is not limited to, code, applications, protocols, interfaces, and processes for controlling one or more systems within a network including, but not limited to, an adapter, a switch, a server, a cluster system, and a grid environment.

In one embodiment, computer system 300 communicates with a remote computer, such as server 340, or a remote client. In one example, server 340 is connected to computer system 300 through any type of network, such as network 302, through a communication interface, such as network interface 332, or over a network link connected, for example, to network 302.

In one embodiment, multiple systems within a network environment are communicatively connected via network 302, which is the medium used to provide communications links between various devices and computer systems communicatively connected. Network 302 includes permanent connections such as wire or fiber optics cables and temporary connections made through telephone connections and wireless transmission connections, for example, and may include routers, switches, gateways and other hardware to enable a communication channel between the systems connected via network 302. Network 302 represents one or more of packet-switching based networks, telephony based networks, broadcast television networks, local area and wire area networks, public networks, and restricted networks.

Network 302 and the systems communicatively connected to computer 300 via network 302 implement one or more layers of one or more types of network protocol stacks which may include one or more of a physical layer, a link layer, a network layer, a transport layer, a presentation layer, and an application layer. For example, network 302 implements one or more of the Transmission Control Protocol/Internet Protocol (TCP/IP) protocol stack or an Open Systems Interconnection (OSI) protocol stack. In addition, for example, network 302 represents the worldwide collection of networks and gateways that use the TCP/IP suite of protocols to communicate with one another. Network 302 implements a secure HTTP protocol layer or other security protocol for securing communications between systems.

In the example, network interface 332 includes an adapter 334 for connecting computer system 300 to network 302 through a link and for communicatively connecting computer system 300 to server 340 or other computing systems via network 302. Although not depicted, network interface 332 may include additional software, such as device drivers, additional hardware and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

In one embodiment, the operations performed by processor 312 control the operations of flowchart of FIGS. 4-9 and other operations described herein. In one embodiment, operations performed by processor 312 are requested by software 350 or other code or the steps of one embodiment of the invention might be performed by specific hardware components that contain hardwired logic for performing the steps, or by any combination of programmed computer components and custom hardware components. In one embodiment, one or more components of computer system 300, or other components, which may be integrated into one or more components of computer system 300, contain hardwired logic for performing the operations of flowcharts in FIGS. 4-9.

In one embodiment, computer system 300 includes multiple peripheral components that facilitate input and output. These peripheral components are connected to multiple controllers, adapters, and expansion slots, such as input/output (I/O) interface 326, coupled to one of the multiple levels of bus 322. For example, input device 324 includes, for example, a microphone, a video capture device, an image scanning system, a keyboard, a mouse, or other input peripheral device, communicatively enabled on bus 322 via I/O interface 326 controlling inputs. In addition, for example, output device 320 communicatively enabled on bus 322 via I/O interface 326 for controlling outputs include, for example, one or more graphical display devices, audio speakers, and tactile detectable output interfaces, but in another example also includes other output interfaces. In alternate embodiments of the present invention, additional or alternate input and output peripheral components may be added.

With respect to FIG. 3, the one or more embodiments present invention including, but are not limited to, a system, a method, and/or a computer program product. In one embodiment, the computer program product includes a computer readable storage medium (or media) having computer readable program instructions thereon for causing a processor to carry out aspects of the present invention.

In one embodiment, the computer readable storage medium is a tangible device that can retain and store instructions for use by an instruction execution device. The computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of the present invention include one or more of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one example, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that in additional or alternate embodiments, the hardware depicted in FIG. 3 may vary. Furthermore, those of ordinary skill in the art will appreciate that the depicted example is not meant to imply architectural limitations with respect to the present invention.

Figure 4:
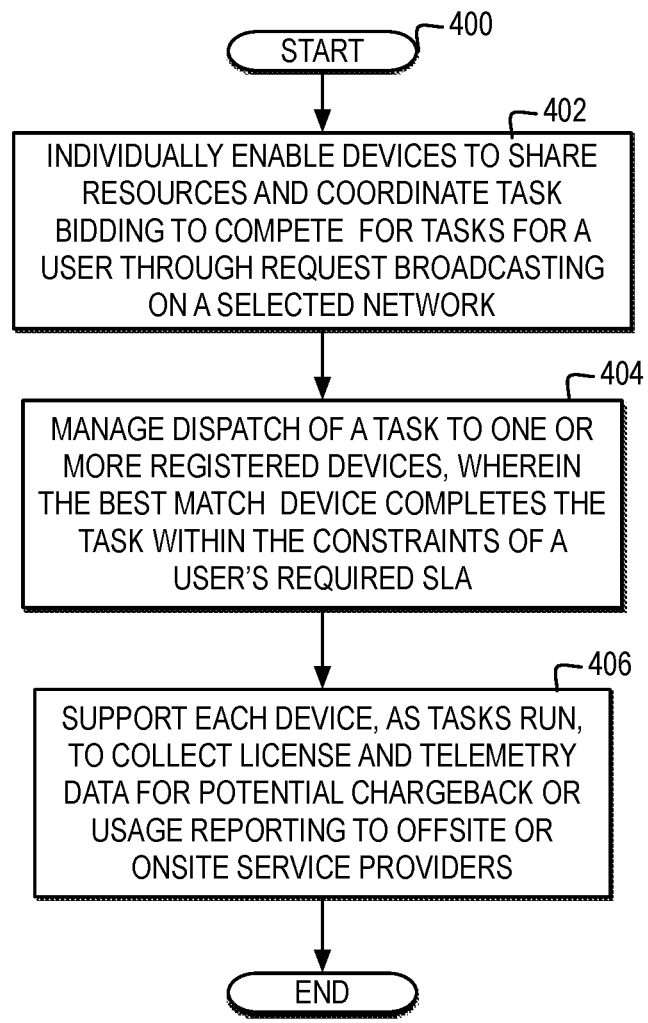
FIG. 4 is a high level logic flowchart illustrating a process and computer program for managing resource sharing and task bidding between devices connected through an IoT.

FIG. 4 illustrates a high level logic flowchart of a process and computer program for managing resource sharing and task bidding between devices connected through an IoT.

In one example, the process and program starts at block 400 and thereafter proceeds to block 402. Block 402 illustrates individually enabling devices to share resources and coordinate task bidding to compete for tasks for a user through request broadcasting on a selected network. Next, block 404 illustrates managing dispatch of a task to one or more registered devices, wherein the best match device offers to the task within the constraints of a user's required SLA. Thereafter, block 406 illustrates, supporting each device, as tasks run, to collect license and telemetry data for potential chargeback or usage reporting to offsite or onsite service providers, and the process ends.

Figure 5:
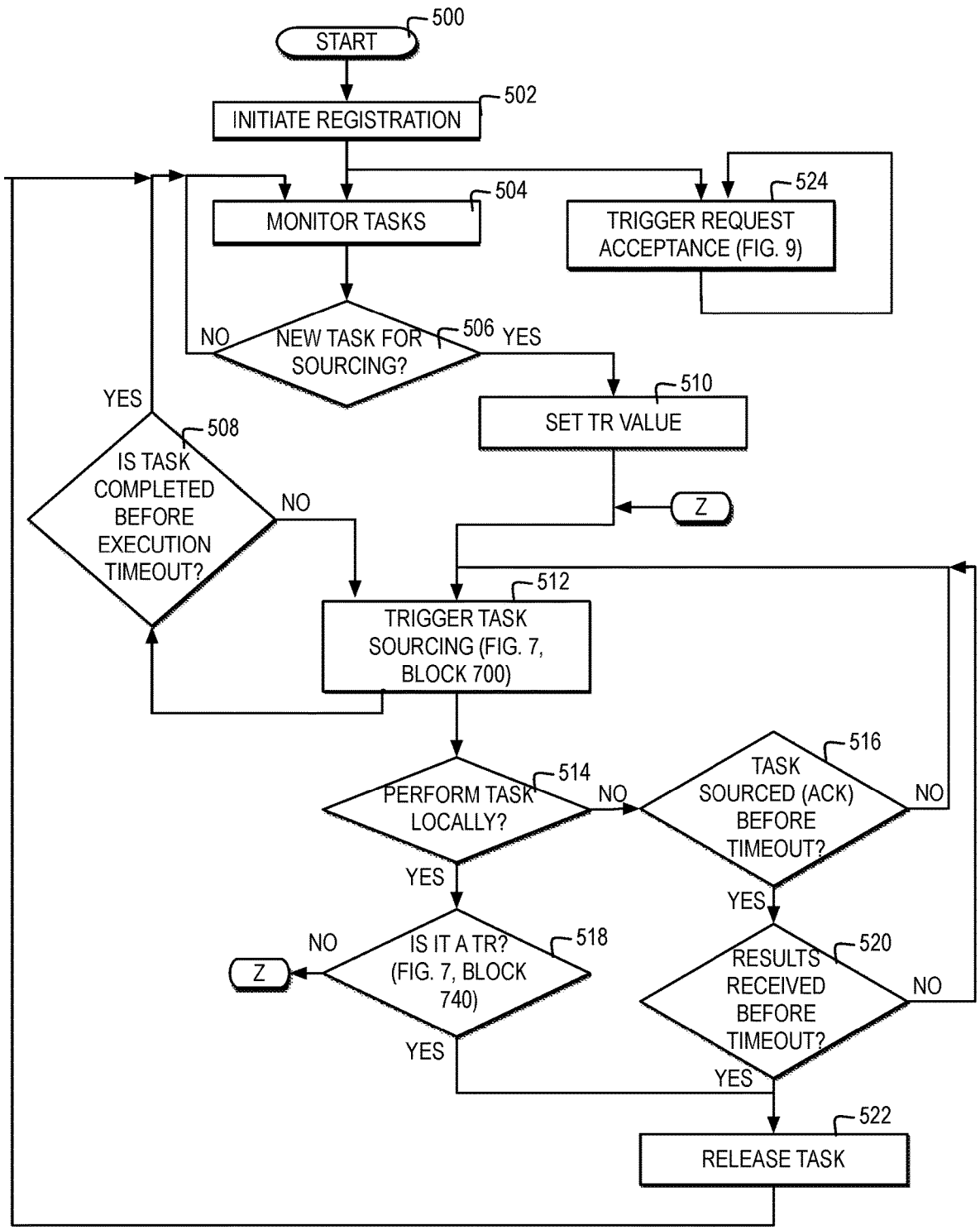
FIG. 5 is a high level logic flowchart illustrating a process and computer program for managing registration, sourcing of tasks, and responding to sourcing requests for a device with IoT interface connectivity.

FIG. 5 illustrates a high level logic flowchart of a process and computer program for managing registration, sourcing of tasks, and responding to sourcing requests for a device with IoT interface connectivity.

In one example, the process and computer program start at block 500 and thereafter proceeds to block 502. Block 502 illustrates initiating registration. In one example, initiating registration in block 502 triggers one or more additional blocks in a process and program, such as the blocks in a process and program illustrated in FIG. 6. Following block 502, the process and program proceeds to block 504 and block 524.

Block 504 illustrates monitoring for tasks. Next, block 506 illustrates a determination whether a new task for sourcing is detected. At block 506, if a new task for sourcing is not detected, the process returns to block 504. At block 506, if a new task for sourcing is detected, the process passes to block 510. Block 510 illustrates setting a TR value, where the TR value is set to indicate whether the task is received from a top level requestor. Thereafter, block 512 illustrates triggering task sourcing, which triggers one or more additional blocks in a process and program, such as the process and program starting at block 700 illustrated in FIG. 7. In response to triggering task sourcing in block 512, when the process returns from FIG. 7, the process and program proceeds to block 508 and block 514.

Block 508 illustrates a determination whether a task is completed before execution timeout. At block 508, once a task is completed before execution timeout, the process returns to block 504. At block 508, until execution timeout occurs, the process may continue to wait for a task completion, and if a timeout is detected, may return to block 512.

Figure 7:
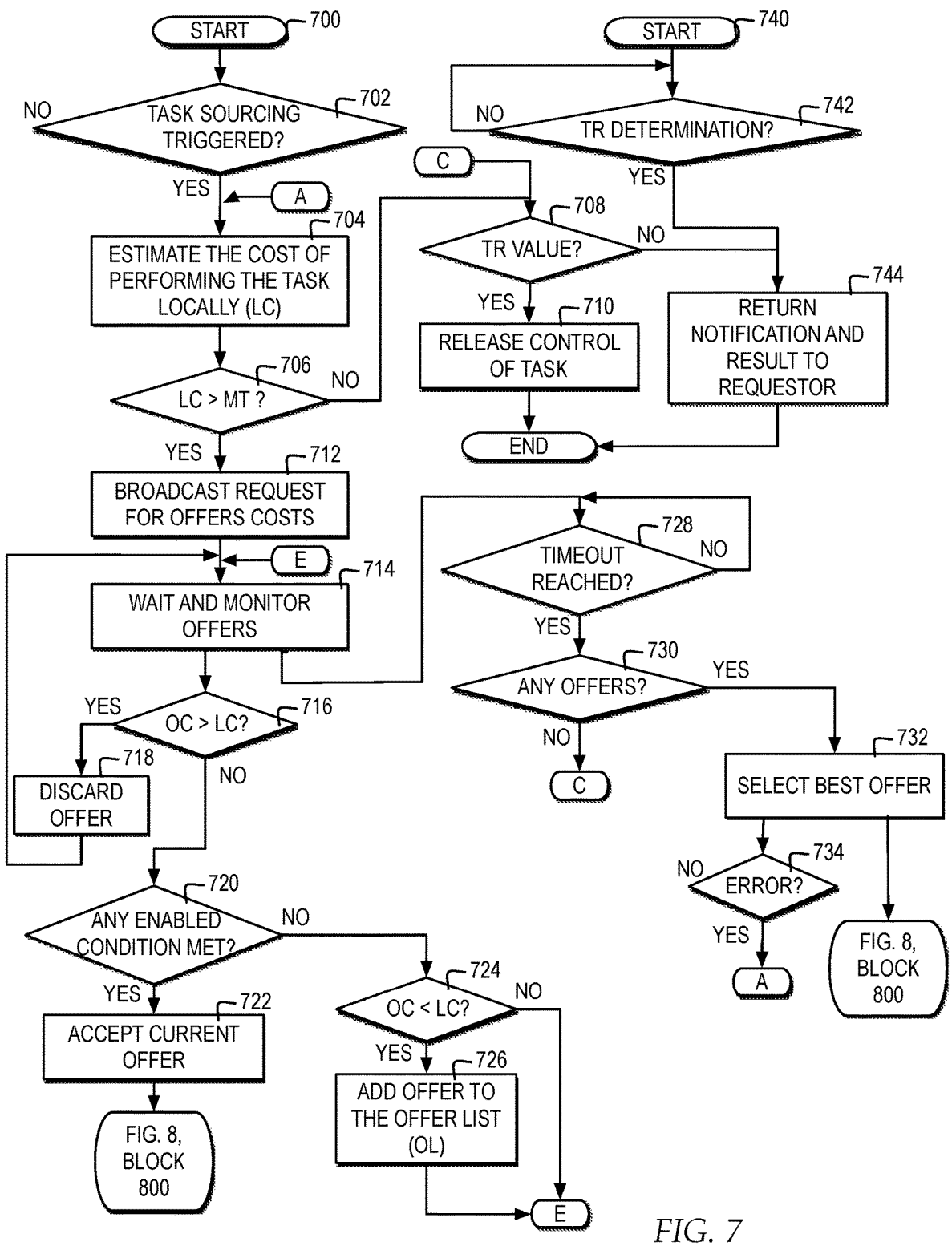
FIG. 7 is a high level logic flowchart illustrating a process and computer program for managing selection of whether to source a task to another device connected through an IoT and for managing selection of bid offers for tasks selected for sourcing.

Block 514 illustrates a determination whether the triggered task sourcing returned from the process and program in FIG. 7 selects to perform the task locally. At block 514, if the triggered task is selected to be performed locally, then the process passes to block 518. Block 518 illustrates a determination whether the TR flag is set to indicate the task is received from a top level requestor. Block 518 may trigger the process and program starting at block 740 of FIG. 7. At block 518, if the process returns from FIG. 7 and the TR flag is not set, then the process returns to block 512. At block 518, if process returns from FIG. 7 and the TR flag is set, then the process passes to block 522.

Returning to block 514, if the triggered task was not selected to be performed locally, then the process passes to block 516. Block 516 illustrates a determination whether the task sourcing is acknowledged before timeout. At block 516, if the task is not acknowledged before timeout, then the process returns to block 512. At block 516, if the task is acknowledged before timeout, then the process passes to block 520. Block 520 illustrates a determination whether results are received before timeout. At block 520, if the results are not received before timeout, then the process returns to block 512. At block 520, if the results are received before timeout, then the process passes to block 522. Block 522 illustrates releasing the task, and the process returns to block 504.

Figure 6:
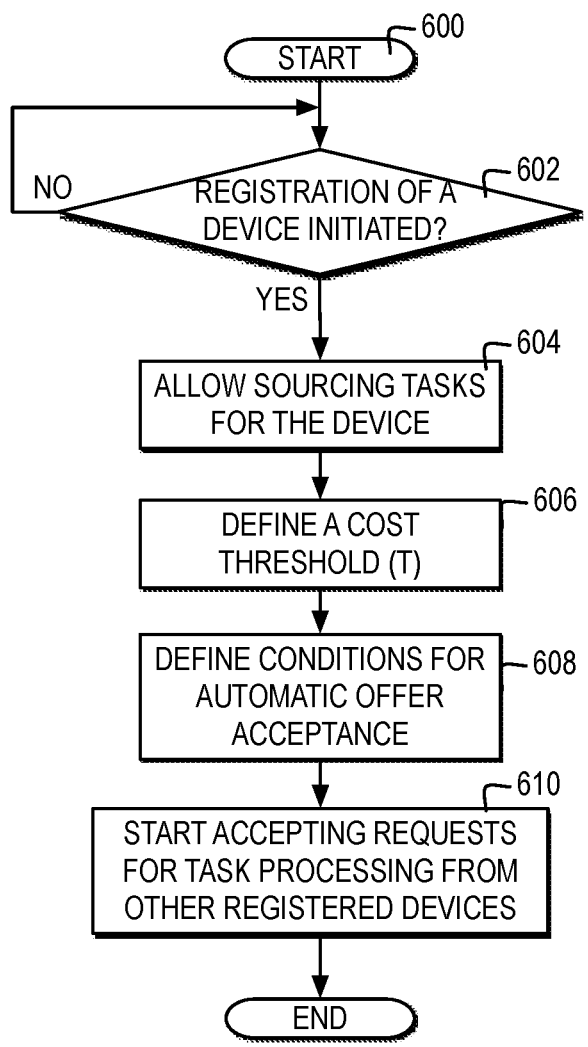
FIG. 6 is a high level logic flowchart illustrating a process and computer program for managing registration of a device with IoT interface connectivity for resource sharing and task bidding through an IoT.

FIG. 6 illustrates a high level logic flowchart of a process and computer program for managing registration of a device with IoT interface connectivity for resource sharing and task bidding through an IoT.

In one example, the process and computer program starts at block 600 and thereafter proceeds to block 602. Block 602 illustrates a determination whether registration of a device is initiated. At block 602, if device registration is initiated, then the process passes to block 604. Block 604 illustrates allowing sourcing tasks for the device. Next, block 606 illustrates defining a cost threshold (T) for the device. Thereafter, block 608 illustrates defining conditions for automatic offer acceptance. Next, block 610 illustrates starting to accept broadcast requests for task processing from other registered devices, and the process ends.

FIG. 7 illustrates a high level logic flowchart of a process and computer program for managing selection of whether to source a task to another device connected through an IoT and for managing selection of bid offers for tasks selected for sourcing.

In one example, the process and computer program starts at block 700 and thereafter proceeds to block 702. Block 702 illustrates a determination of whether a task sourcing gets triggered. At block 702, if task sourcing is triggered, then the process passes to block 704. Block 704 illustrates estimating the cost of performing the task locally (LC). Next, block 706 illustrates a determination whether the LC is greater than a maximum threshold (MT) for the device. At block 706, if the LC is not greater than the MT, then the process passes to block 708. Block 708 illustrates a determination whether a TR value is set for the task to indicate the task is from a top level requestor. At block 708, if the TR value is not set, then the process passes to block 744. Block 744 illustrates returning a notification and result of the task to the requestor, and the process returns. Otherwise, at block 708, if the TR value is set, then the process passes to block 710. Block 710 illustrates releasing control of the task and the process returns.

Returning to block 706, if the LC is greater than the MT, then the process passes to block 712. Block 712 illustrates broadcasting a request for offer costs for the task. Next, block 714 illustrates waiting and monitoring for offers from other devices, and the process proceeds to block 716 and block 728.

Block 716 illustrates a determination whether, for each offer received, the offer cost (OC) is greater than the LC. At block 716, if the OC is greater than the LC, then the process passes to block 718. Block 718 illustrates discarding the offer, and the process returns to block 714. Otherwise, at block 718, if the OC is not greater than the LC, then the process passes to block 720. Block 720 illustrates a determination whether any enabled conditions are met. At block 720, if any enabled conditions are met, such a an offer with a cost below a conditional threshold, then the process passes to block 722. Block 722 illustrates accepting the current offer and the process passes to block 800 of FIG. 8. Returning to block 720, if no enabled conditions are met, then the process passes to block 724. Block 724 illustrates a determination whether the OC is less than the LC. At block 724, if the OC is less than the LC, then the process passes to block 726. Block 726 illustrates adding the offer to the offer list (OL), and the process returns to block 714.

Block 728 illustrates a determination whether a timeout is reached while monitoring for offers. Once a timeout is reached, then the process passes to block 730, unless the process has already exited following block 722. Block 730 illustrates a determination whether any offers are in the offer list (OL). If no offers are in the OL, then the process passes to block 708. If there are offers in the OL, then the process passes to block 732. Block 732 illustrates selecting the best offer, which may be the lowest OC in the OL. Next, block 732 illustrates a determination of whether there are any errors in selecting a best offer. If there is any error in selecting a best offer, such as no offer selected from the OL, then the process returns to block 704. Otherwise, at block 732, the process passes to block 800 of FIG. 8.

Figure 8:
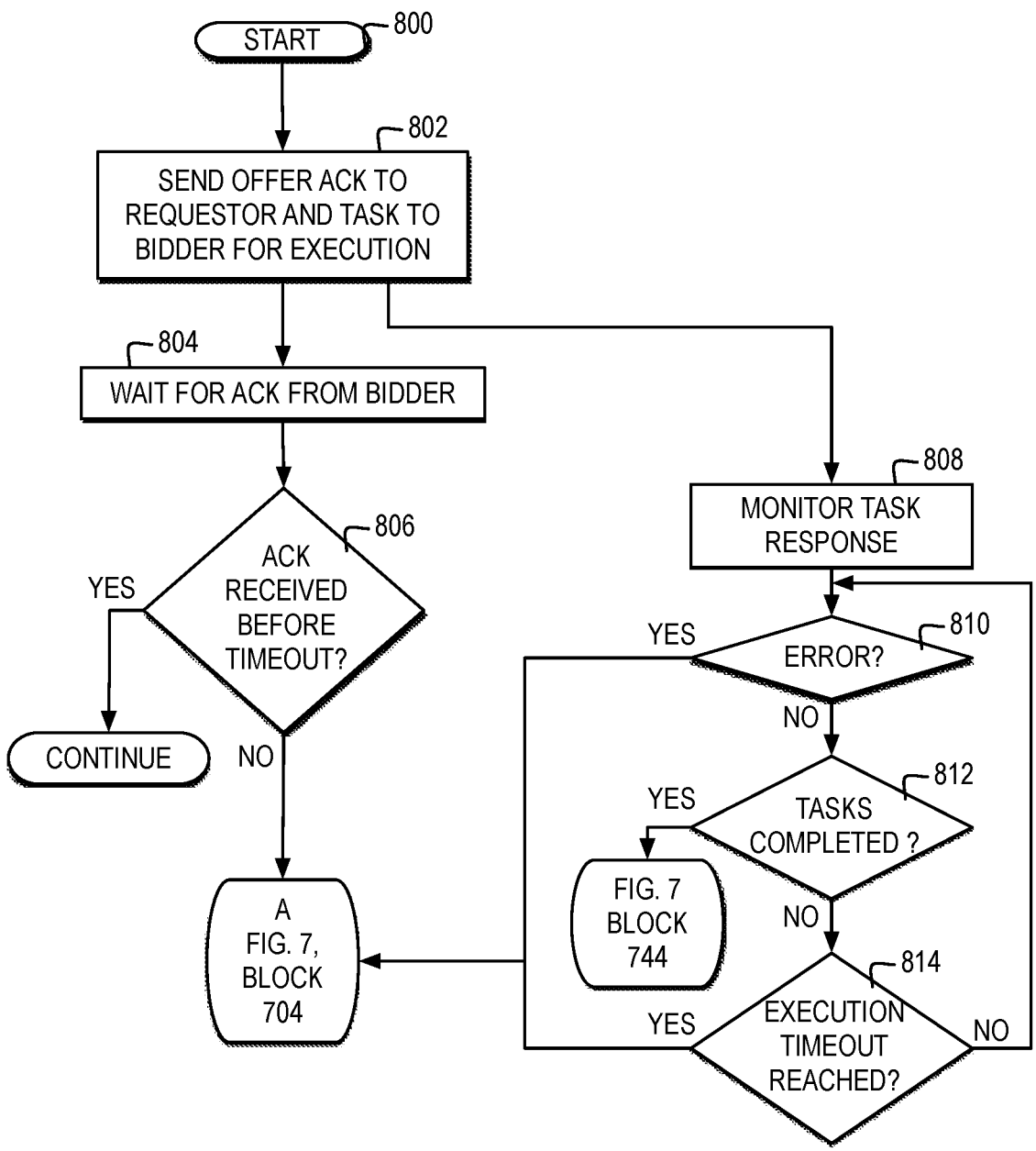
FIG. 8 is a high level logic flowchart illustrating a process and computer program for monitoring for task completion of a sourced task to a device connected to the task requestor through an IoT.

FIG. 8 illustrates a high level logic flowchart of a process and computer program for monitoring for task completion of a sourced task to a device connected to the task requestor through an IoT.

In one example, the process and computer program starts at block 800 and thereafter proceeds to block 802. Block 802 illustrates sending an offer acknowledgement (ACK) to the requestor and a task to the bidder for execution, and the process passes to block 804 and block 808.

Block 804 illustrates waiting for an ACK from the bidder in response to sending the task to the bidder for the selected best offer. Next, block 806 illustrates a determination whether an ACK from the bidder is received before timeout. At block 806, if an ACK from the bidder is not received before timeout, then the process returns to block 704 of FIG. 7. At block 806, if an ACK is received before timeout, then the process continues.

Block 808 illustrates monitoring for task responses from the bidder. Next, block 810 illustrates a determination whether an error indicator is received from the bidder. At block 810, if an error indicator is received, then the process returns to block 704 in FIG. 7. At block 810, if no error indicator is received, then the process passes to block 812. Block 812 illustrates a determination whether a task complete indicator is received. At block 812, if a task complete indicator is received, then the process returns to block 744 of FIG. 7. At block 812, if a task complete indicator is not received, then the process passes to block 814. Block 814 illustrates a determination whether execution timeout is reached, prior to a task complete or error indicator. At block 814, if an execution timeout is not reached, then the process returns to block 810. At block 814, if an execution timeout is reached, then the process returns to block 704 of FIG. 7.

Figure 9:
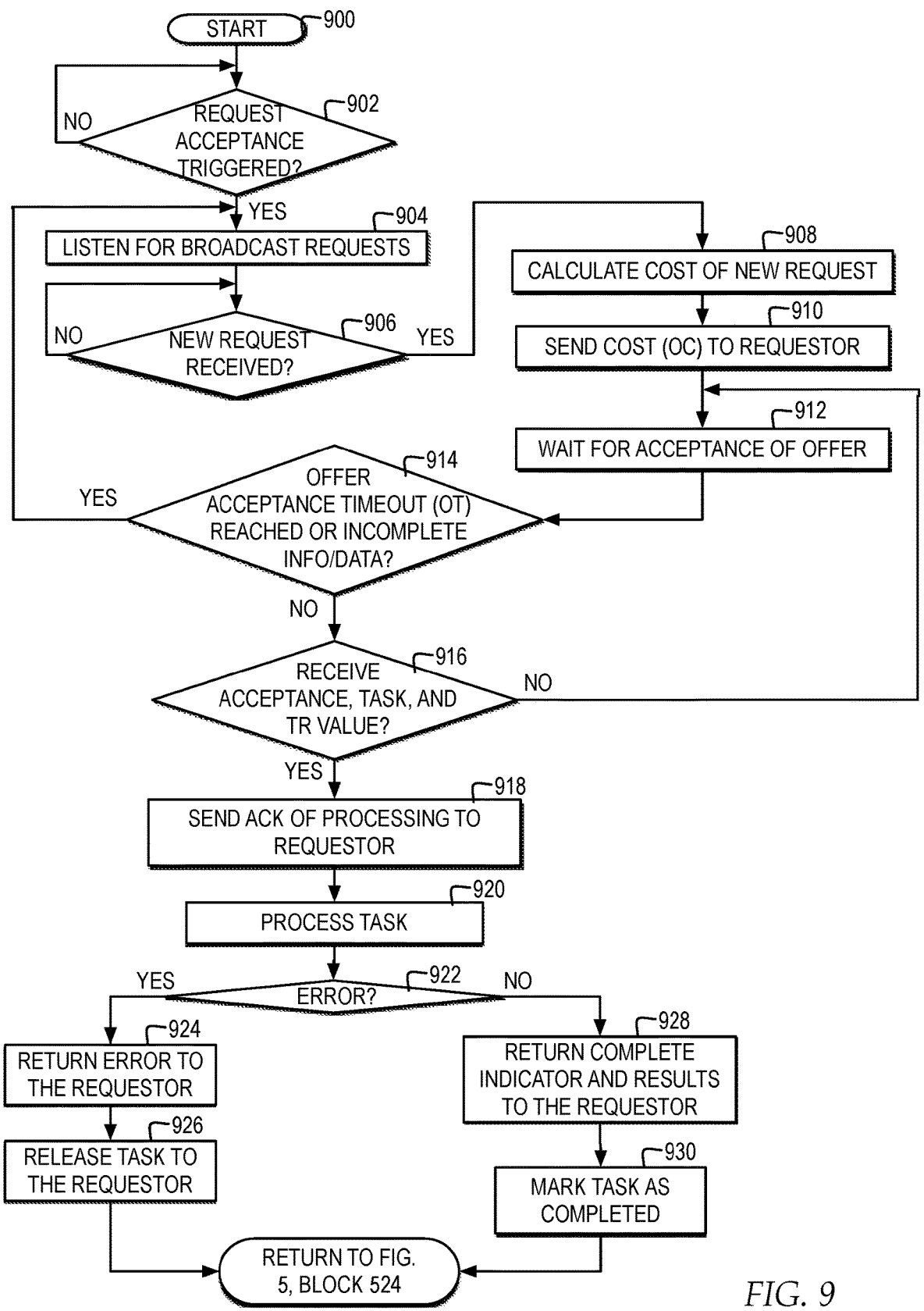
FIG. 9 illustrates a high level logic flowchart illustrating a process and computer program for monitoring for bid requests, managing bid offers, and managing resource sharing for a device with IoT interface connectivity to other devices in an IoT.

FIG. 9 illustrates a high level logic flowchart of a process and computer program for monitoring for bid requests, managing bid offers, and managing resource sharing for a device with IoT interface connectivity to other devices in an IoT.

In one example, the process and computer program starts at block 900 and thereafter proceeds to block 902. Block 902 illustrates a determination whether request acceptance is triggered, such as by block 524 of FIG. 5. At block 902, if request acceptance is triggered, such as at the completion of registration of a device for sourcing, then the process passes to block 904. Block 904 illustrates listening for broadcast requests. Next, block 906 illustrates a determination whether a new request is received. At block 906, if a new request is received, then the process passes to block 908. Block 908 illustrates calculating the cost for the new request. Next, block 910 illustrates sending the calculated cost as the offer cost (OC) to the bid. Thereafter, block 912 illustrates waiting acceptance of the offer, and the process proceeds to block 914.

Block 914 illustrates a determination whether an offer acceptance timeout (OT) is reached or incomplete information or data is received in response to an offer. At block 914, if an offer acceptance timeout is not reached or incomplete information or data is not received in response to an offer, then the process passes to block 916. Otherwise, the process returns to block 904, to continue listening for broadcast requests. Block 916 illustrates a determination whether an acceptance, task, and TR value are received. At block 916, if an acceptance, task, and TR value are not received, then the process returns to block 912. At block 916, if an acceptance, task, and TR value are received, then the process passes to block 918. Block 918 illustrates sending an acknowledgement of processing to the requestor. Next, block 920 illustrates processing the task. Thereafter, block 922 illustrates a determination whether an error is detected during task processing At block 922, if an error is detected during task processing, then the process passes to block 924. Block 924 illustrates returning an error to the requestor. Next, block 926 illustrates releasing the task, incomplete, to the requestor, and the process returns to block 524 of FIG. 5.

At block 922, if no error is detected during task processing, then the process passes to block 928. Block 928 illustrates returning a completion indicator and the result to the requestor. Next, block 930 illustrates marking the task as completed, and the process returns to block 524 of FIG. 5.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The foregoing description is just an example of embodiments of the invention, and variations and substitutions. While the invention has been particularly shown and described with reference to one or more embodiments, it will be understood by those skilled in the art that various changes in form and detail may be made therein without departing from the spirit and scope of the invention.

What is claimed is:

1. A method comprising:
    enabling, by a computer system, a particular device communicatively connected on a network, to share one or more resources of the particular device with a plurality of devices communicatively connected to the network and coordinate task bidding with the plurality of devices through broadcasting requests on the network;
    monitoring, by the computer system, for a new task needing to be performed and designated to be sourced to a web service provider;
    responsive to detecting the new task designated to be sourced to the web service provider, estimating, by the computer system, a local cost of managing the new task locally by the particular device;
    responsive to the local cost not exceeding a maximum threshold, determining, by the computer system, whether the new task is received from a top level requestor;
    responsive to detecting the new task is received from the top level requestor, releasing, by the computer system, control of the new task to be managed locally by the particular device;
    responsive to the local cost exceeding the maximum threshold, coordinating, by the computer system, task bidding with the plurality of devices by broadcasting a particular request for costs for the new task on the network;
    monitoring, by the computer system, for one or more initial bids returned by the plurality of devices, the one or more initial bids each specifying a separate offer cost for managing the new task;
    selecting, by the computer system, from among the one or more initial bids, one or more bids from one or more selected devices, where the one or more bids from the one or more selected devices best match a cost and the service level of the particular request;
    managing, by the computer system, dispatch of the new task as a particular task to the one or more selected devices of the plurality of devices, the particular task migrated to the one or more selected devices instead of handled by the web service provider, by:
  sending, by the computer system, an acceptance and the particular task to the one or more selected devices;
  waiting, by the computer system, for an acknowledgement of the acceptance from the one or more selected devices before a timeout is reached and monitoring for a task response for the particular task from the one or more selected devices;
  responsive to reaching the timeout before the acknowledgment is received, managing, by the computer system, a subsequent determination whether to manage sourcing the particular task among the plurality of devices;
  responsive to receiving the task response with an error indicator, managing, by the computer system, the subsequent determination whether to manage sourcing the particular task among the plurality of devices;
  responsive to receiving the task response with a task completed indicator, returning, by the computer system, a notification and a result from the task response to a requestor; and
  responsive to an execution timeout reached before the task response is received, managing, by the computer system, the subsequent determination whether to manage sourcing the particular task among the plurality of devices; and
monitoring, by the computer system, at the particular device, for a result of execution of the particular task from the one or more selected devices, the one or more selected devices collecting telemetry data for usage reporting to the web service provider.

2. The method according to claim 1, wherein enabling, by a computer system, a particular device communicatively connected on a network, to share one or more resources of the particular device with a plurality of devices communicatively connected to the network and coordinate task bidding with the plurality of devices through broadcasting requests on the network further comprises:
  responsive to a user selecting to register the particular device, setting, by the computer system, the particular device to allow sourcing of tasks for the particular device;
  defining, by the computer system, a cost threshold for sourcing of tasks for the particular device;
  defining, by the computer system, one or more conditions for automatic offer acceptance for bids received in response to requests to source a task; and
  starting, by the computer system, to accept requests for task sourcing from the plurality of devices via the network by setting a sourcing interface to monitor for task sourcing requests broadcast on the network.

3. The method according to claim 1, wherein enabling, by a computer system, a particular device communicatively connected on a network, to share one or more resources of the particular device with a plurality of devices communicatively connected to the network and coordinate task bidding with the plurality of devices through broadcasting requests on the network further comprises:
  enabling, by the computer system, the particular device communicatively connected on the network, to share the one or more resources of the particular device with the plurality of devices communicatively connected to the network and coordinate task bidding with the plurality of devices through broadcasting requests through a sourcing interface integrated in the device, the sourcing interface specified for peer-to-peer broadcasting and detecting broadcasting of the requests over the network.

4. The method according to claim 1, further comprising:
  comparing, by the computer system, the separate offer cost from each of the one or more initial bids with the local cost;
  only adding, by the computer system, a selection of the one or more initial bids to an offer list if the separate offer cost is less than the local cost; and
  selecting, by the computer system, the one or more bids from among the selection of one or more initial bids added to the offer list.

5. The method according to claim 1, further comprising:
  comparing, by the computer system, the separate offer cost from each of the one or more initial bids with the local cost;
  discarding, by the computer system, a selection of the one or more initial bids if the separate offer cost is greater than the local cost;
  determining, by the computer system, for a remaining selection of the one or more initial bids, whether a condition for automatic acceptance is met; and
  responsive to detecting a particular bid of the remaining selection of the one or more initial bids meet the condition for automatic acceptance, automatically accepting, by the computer system, the particular bid.

6. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
  program instructions to enable a particular device communicatively connected on a network, to share one or more resources of the particular device with a plurality of devices communicatively connected to the network and coordinate task bidding with the plurality of devices through broadcasting requests on the network;
  program instructions to monitor for a new task needing to be performed and designated to be sourced to a web service provider;
  program instructions, responsive to detecting the new task designated to be sourced to the web service provider, to estimate a local cost of managing the new task locally by the particular device;
  program instructions to, responsive to the local cost not exceeding a maximum threshold, determine whether the new task is received from a top level requestor;
  program instructions to, responsive to detecting the new task is received from the top level requestor, release control of the new task to be managed locally by the particular device;
  program instructions to, responsive to the local cost exceeding the maximum threshold, coordinate task bidding with the plurality of devices by broadcasting a particular request for costs for the new task on the network;
  program instructions to monitor for one or more initial bids returned by the plurality of devices, the one or more initial bids each specifying a separate offer cost for managing the new task;
  program instructions to select from among the one or more initial bids, one or more bids from one or more selected devices, where the one or more bids from the one or more selected devices best match a cost and the service level of the particular request;
program instructions to manage dispatch of the new task as a particular task to the one or more selected devices of the plurality of devices, the particular task migrated to the one or more selected devices instead of handled by the web service provider, by the stored program instructions further comprising:
program instructions to send an acceptance and the particular task to the one or more selected devices;
program instructions to wait for an acknowledgement of the acceptance from the one or more selected devices before a timeout is reached and monitoring for a task response for the particular task from the one or more selected devices;
program instructions, responsive to reaching the timeout before the acknowledgment is received, to manage a subsequent determination whether to manage sourcing the particular task among the plurality of devices;
program instructions, responsive to receiving the task response with an error indicator, to manage the subsequent determination whether to manage sourcing the particular task among the plurality of devices;
program instructions, responsive to receiving the task response with a task completed indicator, to return a notification and a result from the task response to a requestor; and
program instructions, responsive to an execution timeout reached before the task response is received, to manage the subsequent determination whether to manage sourcing the particular task among the plurality of devices; and
program instructions to monitor, at the particular device, for a result of execution of the particular task from the one or more selected devices, the one or more selected devices collecting telemetry data for usage reporting to the web service provider.

7. The computer system according to claim 6, wherein the program instructions to enable a particular device communicatively connected on a network, to share one or more resources of the particular device with a plurality of devices communicatively connected to the network and coordinate task bidding with the plurality of devices through broadcasting requests on the network further comprise:
program instructions to, responsive to a user selecting to register the particular device, set the particular device to allow sourcing of tasks for the particular device;
program instructions to define a cost threshold for sourcing of tasks for the particular device;
program instructions to define one or more conditions for automatic offer acceptance for bids received in response to requests to source a task; and
program instructions to start to accept requests for task sourcing from the plurality of devices via the network by setting a sourcing interface to monitor for task sourcing requests broadcast on the network.

8. The computer system according to claim 6, wherein the program instructions to enable a particular device communicatively connected on a network, to share one or more resources of the particular device with a plurality of devices communicatively connected to the network and coordinate task bidding with the plurality of devices through broadcasting requests on the network further comprise:
program instructions to enable the particular device communicatively connected on the network, to share the one or more resources of the particular device with the plurality of devices communicatively connected to the network and coordinate task bidding with the plurality of devices through broadcasting requests through a sourcing interface integrated in the device, the sourcing interface specified for peer-to-peer broadcasting and detecting broadcasting of the requests over the network.

9. The computer system according to claim 6, the stored program instructions further comprising:
program instructions to compare the separate offer cost from each of the one or more initial bids with the local cost;
program instructions to only add a selection of the one or more initial bids to an offer list if the separate offer cost is less than the local cost; and
program instructions to select the one or more bids from among the selection of one or more initial bids added to the offer list.

10. The computer system according to claim 6, the stored program instructions further comprising:
program instructions to compare the separate offer cost from each of the one or more initial bids with the local cost;
program instructions to discard a selection of the one or more initial bids if the separate offer cost is greater than the local cost;
program instructions to determine, for a remaining selection of the one or more initial bids, whether a condition for automatic acceptance is met; and
program instructions to, responsive to detecting a particular bid of the remaining selection of the one or more initial bids meet the condition for automatic acceptance, automatically accept the particular bid.

11. A computer program product comprises a computer readable storage medium having program instructions embodied therewith, wherein the computer readable storage medium is not a transitory signal per se, the program instructions executable by a computer to cause the computer to:
enable, by a computer, a particular device communicatively connected on a network, to share one or more resources of the particular device with a plurality of devices communicatively connected to the network and coordinate task bidding with the plurality of devices through broadcasting requests on the network;
monitor, by the computer, for a new task needing to be performed and designated to be sourced to a web service provider;
responsive to detecting the new task designated to be sourced to the web service provider, estimate, by the computer, a local cost of managing the new task locally by the particular device;
responsive to the local cost not exceeding a maximum threshold, determine, by the computer, whether the new task is received from a top level requestor;
responsive to detecting the new task is received from the top level requestor, release, by the computer, control of the new task to be managed locally by the particular device;
responsive to the local cost exceeding the maximum threshold, coordinate, by the computer, task bidding with the plurality of devices by broadcasting a particular request for costs for the new task on the network;
monitor, by the computer, for one or more initial bids returned by the plurality of devices, the one or more initial bids each specifying a separate offer cost for managing the new task;

select, by the computer, from among the one or more initial bids, one or more bids from one or more selected devices, where the one or more bids from the one or more selected devices best match a cost and the service level of the particular request;

manage, by the computer, dispatch of the new task as a particular task to the one or more selected devices of the plurality of devices, the particular task migrated to the one or more selected devices instead of handled by the web service provider, by the program instructions further executable by the computer to cause the computer to:

send, by the computer, an acceptance and the particular task to the one or more selected devices;

wait, by the computer, for an acknowledgement of the acceptance from the one or more selected devices before a timeout is reached and monitoring for a task response for the particular task from the one or more selected devices;

responsive to reaching the timeout before the acknowledgment is received, manage, by the computer, a subsequent determination whether to manage sourcing the particular task among the plurality of devices;

responsive to receiving the task response with an error indicator, manage, by the computer, the subsequent determination whether to manage sourcing the particular task among the plurality of devices;

responsive to receiving the task response with a task completed indicator, return, by the computer, a notification and a result from the task response to a requestor; and responsive to an execution timeout reached before the task response is received, manage, by the computer, the subsequent determination whether to manage sourcing the particular task among the plurality of devices; and monitor, by the computer, at the particular device, for a result of execution of the particular task from the one or more selected devices, the one or more selected devices collecting telemetry data for usage reporting to the web service provider.

12. The computer program product according to claim 11, further comprising the program instructions executable by a computer to cause the computer to:

responsive to a user selecting to register the particular device, set, by the computer, the particular device to allow sourcing of tasks for the particular device;

define, by the computer, a cost threshold for sourcing of tasks for the particular device;

define, by the computer, one or more conditions for automatic offer acceptance for bids received in response to requests to source a task; and start, by the computer, to accept requests for task sourcing from the plurality of devices via the network by setting a sourcing interface to monitor for task sourcing requests broadcast on the network.

13. The computer program product according to claim 11, further comprising the program instructions executable by a computer to cause the computer to:

enable, by the computer, the particular device communicatively connected on the network, to share the one or more resources of the particular device with the plurality of devices communicatively connected to the network and coordinate task bidding with the plurality of devices through broadcasting requests through a sourcing interface integrated in the device, the sourcing interface specified for peer-to-peer broadcasting and detecting broadcasting of the requests over the network.

* * * * *